United States Patent [19]

Haggrén

[11] Patent Number: 4,928,175
[45] Date of Patent: May 22, 1990

[54] METHOD FOR THE THREE-DIMENSIONAL SURVEILLANCE OF THE OBJECT SPACE

[76] Inventor: Henrik Haggrén, Vilniementie 12 D 30, SF-02940 Espoo, Finland

[21] Appl. No.: 259,270
[22] PCT Filed: Apr. 10, 1987
[86] PCT No.: PCT/FI87/00048
§ 371 Date: Oct. 7, 1988
§ 102(e) Date: Oct. 7, 1988
[87] PCT Pub. No.: WO87/06353
PCT Pub. Date: Oct. 22, 1987

[30] Foreign Application Priority Data

Apr. 11, 1986 [FI] Finland .................................. 861550

[51] Int. Cl.$^5$ ............................................. H04N 7/18
[52] U.S. Cl. ..................... 358/108; 358/107; 364/559; 364/560
[58] Field of Search ................. 358/107, 108; 901/47; 364/559, 560

[56] References Cited

U.S. PATENT DOCUMENTS

| | | | |
|---|---|---|---|
| 4,084,184 | 4/1978 | Crain .................................... | 358/108 |
| 4,396,945 | 8/1983 | DiMatteo et al. .................. | 358/107 |
| 4,672,564 | 6/1987 | Egli et al. ............................ | 364/559 |
| 4,791,482 | 12/1988 | Barry et al. ......................... | 358/107 |
| 4,825,394 | 4/1989 | Beamish et al. .................... | 364/560 |

FOREIGN PATENT DOCUMENTS

| | | |
|---|---|---|
| 2402204 | 7/1975 | Fed. Rep. of Germany . |
| 3618480 | 12/1986 | Fed. Rep. of Germany . |
| WO85/04245 | 9/1985 | PCT Int'l Appl. . |
| 2099255 | 12/1982 | United Kingdom . |

Primary Examiner—John W. Shepperd
Assistant Examiner—Michael D. Parker
Attorney, Agent, or Firm—Jordan B. Bierman

[57] ABSTRACT

In order to register the space, there are installed two video cameras at certain angles with respect to each other. In this object space there are arranged control points, the object coordinates ($X_k$, $Y_k$, $Z_k$; k=1, 2, 3 . . .) whereof are measured and the imagewise image coordinates ($x_{ki}$, $y_{ki}$; $x_{kj}$, $y_{kj}$) are determined from the corresponding video cameras, whereafter the control points can be removed from the object space. On the basis of the image coordinate values and the object space coordinate values of the control points, there are calculated the orientation parameters ($a_{11}$ . . . $a_{33}$) of projective resection, whereafter the unknown object space coordinates (X, Y, Z) of the observed object points can be solved in a real-time process on the basis of the image coordinates (x, y) registered by the video cameras and by making use of projective intersection.

7 Claims, 4 Drawing Sheets

METHOD FOR THE THREE-DIMENSIONAL SURVEILLANCE OF THE OBJECT SPACE

The present invention relates to a method for the three-dimensional surveillance of the object space, wherein there are arranged at least two image acquisition devices such as video cameras in order to observe the object space, and the images received by the said devices from the said space are digitized, the object points are located on the image planes of the image acquisition devices, and by means of the image coordinates of the said object points and the preset constants, the coordinates of the object points are determined within the three-dimensional object space.

The method of the present invention can be employed for supervising the object space in various conditions and possibly for controlling three-dimensionally the tasks carried out therein. As the three-dimensional variables describing the prevailing conditions, the system supervises various quantities describing the object space and the geometrical shapes of the elements contained therein, as well as their mutual positions and location in the object space and the physical properties of the separate elements of the object.

In the prior art there are known various methods for the three-dimensional supervision of the object space by aid of image acquisition devices, among others those introduced in the Brittish patent application GB 2 099 255 A and the German patent application DE-A 2 402 204.

In the method of the Brittish application, the location of a moving object in the object space is determined by means of at least two cameras. The location of the object is identified on the image plane of each camera, and by aid of these image coordinates of the object, the location of the object within the object space is then calculated. The calculation method is based on the equation of projection of the lens. The focal distance in the optics of both cameras is known. Preliminary to the procedure, there are determined the object space coordinates, in relation to which the angles of the main axis of the camera optics are defined, as well as the distances of the cameras with respect to the origin of the object space coordinates.

In the German application, the location of the object in the object space coordinates is determined by aid of three cameras which are located on the same plane at an angle of 90° with respect to each other. The distances of the cameras from the origin of the object space coordinates are known. The location of the object on the image plane of each camera is expressed, and the deviation of the object, i.e. the angle with respect to the main axis of each camera (the axes of the object space coordinates) is defined. The space coordinates of the object are calculated according to certain geometrical equations, wherein the said angles and constants are substituted.

The major drawback in the methods and apparatuses introduced in the above mentioned applications is their inflexibility; they are installed for supervising a given space, whereafter they cannot be shifted. Particularly when several cameras are used for real three-dimensional measuring, the cameras are placed at certain angles (45°, 90°) with respect to each other. This helps to avoid complex calculations when the coordinates are changed. The method and apparatus introduced in the Brittish application is related to the detection of the location of a given object; it is not related to observing changes within the object space. Particularly when the cameras are placed at an angle other than 90° with respect to each other, the changes for errors in the location of the object are drastically increased; the angles of the main axes of the cameras in relation to the axis of the object space coordinates should be determined extremely accurately, as well as the distances of the cameras from the origin of the object space coordinates. This demand for precision in the installation and orientation of the cameras means that the accuracy achieved by the whole system remains relatively modest unless these tasks are carried out with painstaking care. Additional errors are caused by drawbacks in the camera optics. However, high-quality optics and careful assemblage always mean high expenses.

By employing the method of the present invention, among others the problems described in the above applications can in most cases be solved. The invention is characterized by the novel features enlisted in the appended patent claims.

The measuring method of the invention is a real-time process and the feedback is obtained at the moment of observation. In addition to three-dimensional geometrical information, the method of the present invention can be employed for observing such physical quantities as are necessary for defining the characteristic data of the object space. The object under measurement can be large in size, and it is not necessary to limit the number of pointings. The method does not require that the points of measurement should be activated or signalized. The area of measurement is the whole freely visible area. When required, the measuring system realizing the method can be shifted, easily reset, and it can be automated to a very high degree.

Moreover, the method of the present invention has some properties that are indirectly useful. First of all, along with the present invention, the use of photogrammetry becomes possible in several such measuring tasks requiring a real-time process that so far have been practically impossible. As an example let us mention various assemblage and installation tasks, underwater control and maintenance, the remote control navigation of automatically guided vehicles, and space supervision based on the observance of temperatures. Secondldy, in most measuring tasks, an increase in the degree of automation leads to an increase in the efficiency. The performing time of the tasks themselves is shortened, and the need for the costly system expertise is limited mainly to the tasks preceding the set-up of the measuring system and space. Thirdly, along with the measuring system, the manufacturing and assembly work can be integrated into the existing data processing, planning and material administration arrangements of the user. It is also pointed out that the degree of utilization of the user's CAD system is increased when it can be employed both for controlling the measuring system and for comparing the measuring results immediately with the ratings of the plans.

In the following the invention and its background are explained in more detail with reference to the appended drawings, wherein FIG. 1 illustrates a geometrical model on which the method of the invention is based, and FIG. 2 illustrates how the object point is located on the basis of at least two plane projections;

Figure 1:
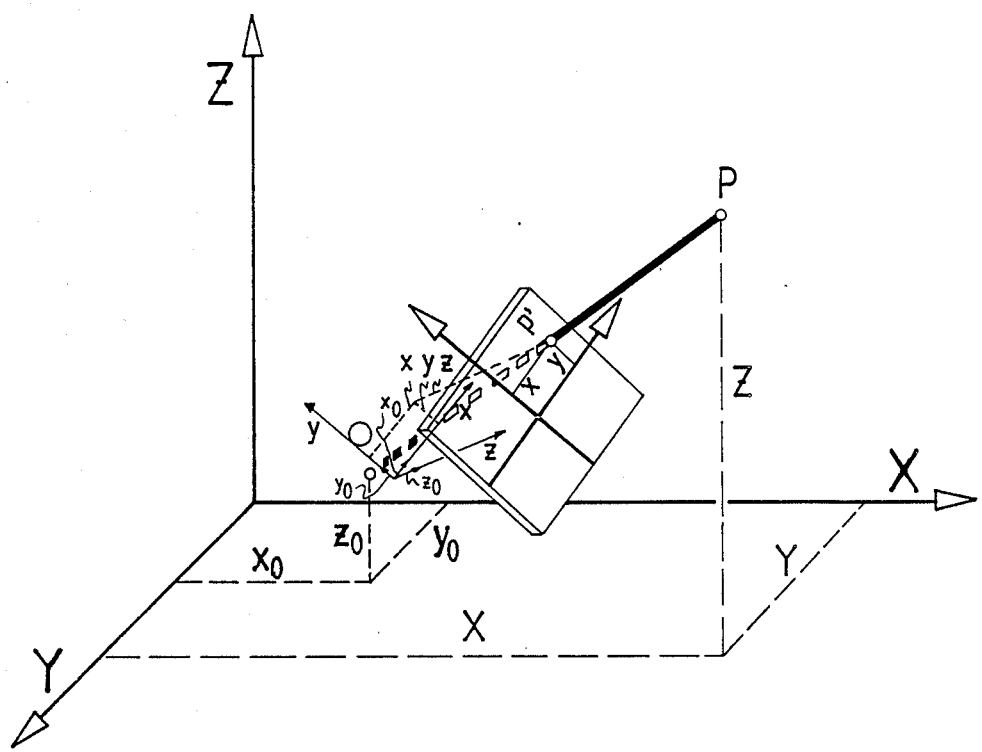
Figure 5:
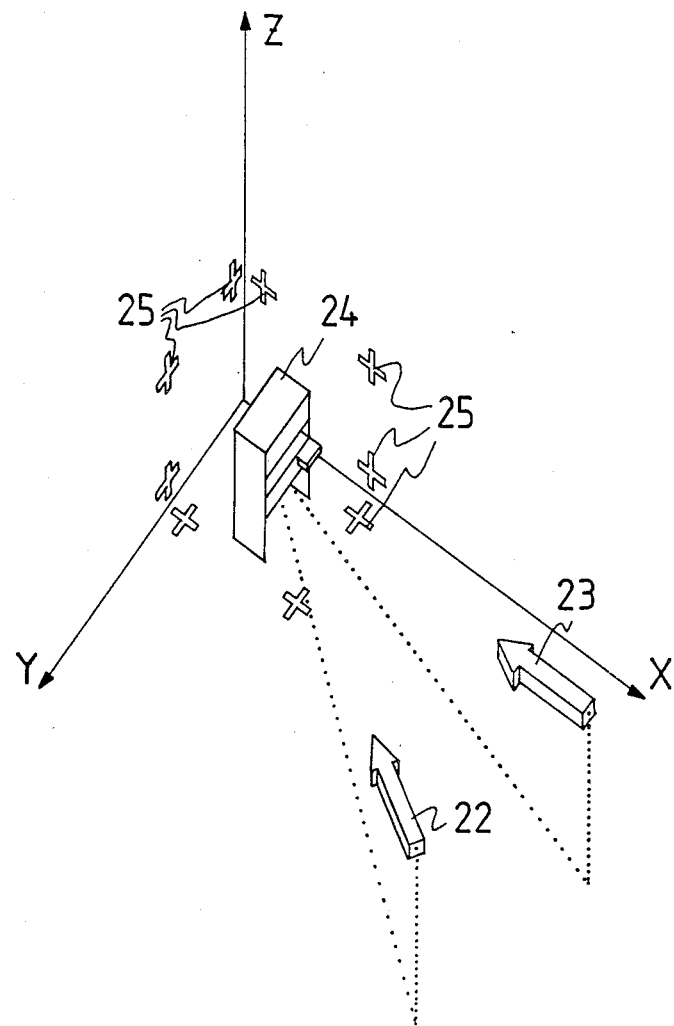

FIG. 5 illustrates how the control points are utilized in the determination of the orientation parameters The method of the present invention for the three-dimensional supervision of the object space is based on the use of projective, two-dimensional plane observations. When a given detail is observed and located by aid of at least two images, its location in the object space can be determined by three-dimensional coordinates. Let use observe FIG. 1. There the object point P is projected on the image plane as the point P'. The distance between the object point P and the image point P' is determined through projection in a so-called resection.

The general equation of projection in the case of resection can be expressed as follows:

$$(1) \begin{cases} \dfrac{(x - x_0)}{(z - z_0)} = \dfrac{a_{11}(X - X_0) + a_{21}(Y - Y_0) + a_{31}(Z - Z_0)}{a_{13}(X - X_0) + a_{23}(Y - Y_0) + a_{33}(Z - Z_0)} \\ \dfrac{(y - y_0)}{(z - z_0)} = \dfrac{a_{12}(X - X_0) + a_{22}(Y - Y_0) + a_{32}(Z - Z_0)}{a_{13}(X - X_0) + a_{23}(Y - Y_0) + a_{33}(Z - Z_0)} \end{cases}$$

where
$x, y, z$ = the image coordinates of the point of image;
$x_0, y_0, z_0$ = the image coordinates of the projection center of the camera;
$X, Y, Z$ = the object space coordinates of the object point;
$a \ldots a$ = the elements, i.e. the orientation parameters, of the orthogonal rotation matrix of the coordinate change between the camera and object space coordinates.

When we write $z - z_0 = c$, i.e. the absolute value of the distance of the projection centre of the camera and the image plane ("the focal distance"), and substitute this clause in the equations (1), we get $$(2) \begin{cases} x = x_0 + c \cdot \dfrac{a_{11}(X - X_0) + a_{21}(Y - Y_0) + a_{31}(Z - Z_0)}{a_{13}(X - X_0) + a_{23}(Y - Y_0) + a_{33}(Z - Z_0)} \\ y = y_0 + c \cdot \dfrac{a_{12}(X - X_0) + a_{22}(Y - Y_0) + a_{32}(Z - Z_0)}{a_{13}(X - X_0) + a_{23}(Y - Y_0) + a_{33}(Z - Z_0)} \end{cases}$$

The orientation parameters $a_{11} \ldots a_{33}$ include the unknown quantities $\gamma$, $\theta$, and $\omega$, which are the angles of orientation between the object space coordinates and camera coordinates. Now the solving of the unknown quantities of each image entails at least the determination of the following unknowns:

$$(3) \begin{cases} \gamma, \theta, \omega \\ x_0, y_0, z_0 = c \\ X_0, Y_0, Z_0 \end{cases}$$

The total number of the unknowns is 9. From each predetermined control point we get two equations of observation (2), and therefore in order to solve the unknowns in one single image we need at least five control points where X, Y and Z are known. It is also pointed out that the control points must be independent of each other in such a fashion that they are not located on the same plane, in order to obtain an aunambiguous solution.

The rays of projection are never absolutely straight, but they are diffracted in the medium agent (air, lens, water etc.). These diffraction errors can be taken into account by enlarging the mathematical model by aid of so-called auxiliary parameters. If these auxiliary parameters can be treated as systematical sources of error, they can be solved image by image. The most commonly used models for auxiliary parameters correct the lens distortion errors and errors in the image coordinates.

The use of the enlarged model must always be considered separately for each case. Practice has shown that justified grounds for use exist when the influence of the auxiliary parameter is at least 1/5 of the measuring accuracy of the image coordinate. The use of auxiliary parameters also requires respective measuring accuracy as regards the object space coordinates of the control points. Each auxiliary parameter inpart requires new control points and equations of observation (2).

Figure 2:
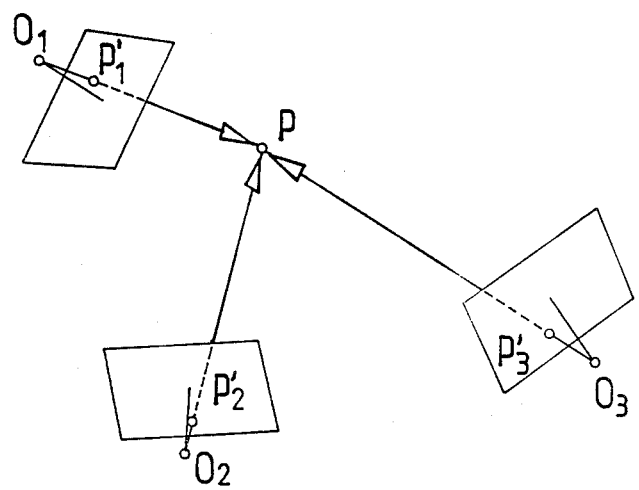

The reversed projection, FIG. 2, i.e. from the image into the object, is not unambiguous with respect to the object point P. At least two plane projections are used in locating the object point. The location is carried out, by aid of the projection lines $O_iP_i$ ($i=1, 2, 3, \ldots$) reconstructed from the projective measurements, in a so-called intersection.

In the intersection, the reversed forms of the equations of projection (1) are employed. Because by defining the object points there must be in each case defined three coordinate values, the object point must always be observed with at least two images i and j.

The general aquation of projection can be presented in the following form:

$$(4) \begin{cases} \dfrac{X - X_0}{Z - Z_0} = \dfrac{a_{11}(x - x_0) + a_{12}(y - y_0) + a_{13}(z - z_0)}{a_{31}(x - x_0) + a_{32}(y - y_0) + a_{33}(z - z_0)} \\ \dfrac{Y - Y_0}{Z - Z_0} = \dfrac{a_{21}(x - x_0) + a_{22}(y - y_0) + a_{23}(z - z_0)}{a_{31}(x - x_0) + a_{32}(y - y_0) + a_{33}(z - z_0)} \end{cases}$$

where
x and y are the observed camera coordinates of the new point in image i and j, and
X, Y, X are the object space coordinates of the new point to be calculated.

The rest of the quantities, i.e. the orientation parameters $a_{11} \ldots a_{33}$, are solved image by image in connection with the resection.

By substituting the observations and the solved unknown quantities in the equations (4) we obtain $$(5) \begin{cases} X - X_{0i} = (Z - Z_{0i}) \cdot I_{i1} \\ Y - Y_{0i} = (Z - Z_{0i}) \cdot I_{i2} \\ X - X_{0j} = (Z - Z_{0j}) \cdot I_{j1} \\ Y - Y_{0j} = (Z - Z_{0j}) \cdot I_{j2} \end{cases}$$

In the equations, the right-hand side of the equations (4) is marked imagewise with the following constants: $I_{i1}$, $I_{i2}$, $I_{j1}$ and $I_{j2}$. Thereafter the object space coordinates X, Y and Z can be solved from the equations (5) stage by stage for instance as follows:

$$X = X_{0i} + (Z - Z_{0i}) \cdot I_{i1} = X_{0j} + (Z - Z_{0j}) \cdot I_{j1} \quad (a)$$

$$X_{0i} + Z \cdot I_{i1} - Z_{0i} \cdot I_{i1} = X_{0j} + Z \cdot I_{j1} - Z_{0j} \cdot I_{j1} \quad (b)$$

$$Z = \frac{X_{0j} - X_{0i} - Z_{0j} \cdot I_{j1} + Z_{0i} \cdot I_{i1}}{I_{i1} - I_{j1}}, \quad (c)$$

whereafter Z is solved, and the process is continued for instance as follows:

$$X = (Z - Z_{0i}) I_{i1} - X_{0i} \quad (d)$$

and $$Y = (Z - Z_{0i}) I_{i2} - Y_{0i}, \quad (e)$$

whereafter X and Y are also solved.

If the model enlarged with auxiliary parameters is used, then before solving the object space coordinates X, Y and Z, in the image observations $x_i$, $y_i$, $x_j$ and $y_j$ there are made the corresponding corrections as in connection with the resection process.

In the method of the invention the image acquisition devices, such as video cameras, are installed at an angle with respect to each other in order to observe the desired object space, and in this object space there are arranged control points; the object coordinates $X_k$, $Y_k$, $Z_k$; k=1, 2, 3... of the said control points are measured, and the projectionwise image coordinates $x_{ki}$, $y_{ki}$, $x_{kj}$, $y_{kj}$ are determined on the corresponding image acquisition devices i, j, whereafter the control points can be removed from the object space; on the basis of the image and object space coordinate values the orientation parameters $a_{11} \ldots a_{33}$ of projective resection are calculated, whereafter the unknown object space coordinates X, Y, Z of the observed object points can be solved in a real-time process by aid of the image coordinates $x_i$, $y_i$, $x_j$, $y_j$ observed on the image acquisition devices by utilizing the method of projective intersection.

It is pointed out that in the method of the present invention it is not necessary to determine the image acquisition devices nor their location before carrying out the projection, nor the angles of orientation between the object and camera coordinates nor the focal distances of the cameras. Moreover, the employed control points are generalldy removed from the object space immediately after their location is determined and/or after the orientation parameters are calculated, so that they do not by any means disturb the supervision of the object space. When the orientation parameters of the image acquisition devices are determined, each sufficiently changed object or an object otherwise distinctive in the background, which object is located within the common field of vision of the cameras, i.e. within the object space, can be located.

In the method of the invention, the once determined orientation parameters $a_{11} \ldots a_{33}$ are continuously used when solving the unknown object space coordinates X, Y, Z of the object points by aid of the image coordinates, x, y, observed on the image acquisition devices, as long as the said devices are positioned at a solid angle with respect to each other and register the object space. When following this procedure, the determination of the coordinates of the object points is considerably speeded up; in the determination procedure, the stage which takes the largest period of time is the calculation of the orientation parameters.

One preferred example of the application of the method of the invention is an application where the image acquisition devices are coupled at given intervals from each other in a stationary manner and at solid angles with respect to each other, so that their common field of vision, i.e. the object space, is defined and this space can be continuously observed. This means that the image acquisition devices, together with their object space, form a closed system. It is not dependent on external factors. This being the case, the projection system can be constructed on a movable platform (car, train carriage, ship, etc.), and it can supervise its surroundings outside this movable platform within the range of the common field of vision of the image acquisition devices. The orientation parameters can be determined beforehand in the desired conditions, whereafter the measuring system can be employed in on-site work.

The general equations of projection in resection (1) and in intersection (4) can be presented in general form as the following transformation matrix:

$$(6) \begin{vmatrix} X \\ Y \\ Z \end{vmatrix}_{ij} = \begin{vmatrix} X_0 \\ Y_0 \\ Z_0 \end{vmatrix}_{ij} + \begin{vmatrix} a_{11} & a_{12} & a_{13} \\ a_{21} & a_{22} & a_{23} \\ a_{31} & a_{32} & a_{33} \end{vmatrix}_{ij} \cdot \begin{vmatrix} x \\ y \\ c \end{vmatrix}_{ij}$$

where $X_i, Y_i, Z_i$ = the object space coordinates, i.e. the
$X_j, Y_j, Z_j$     coordinates of the object points in the
               XYZ coordinates of the object space;

$X_{0i}, Y_{0i}, Z_{0i}$ = the constants representing the projection
$X_{0j}, Y_{0j}, Z_{0j}$     point $0_i$, $0_j$ of each image acquisition
               device i, j;

$a_{11} \ldots a_{33}$ = the projective orientation parameters of
               the images;

$c_i, c_j$ = the constants of the image acquisition
               devices;

$x_i, y_i$ = the coordinates of the image points on the
$x_j, y_j$     image planes of each image acquisition
               device i, j;

i, j = the image acquisition devices i and j.

On the basis of this transformation matrix, all required quantities can be solved as was described above in connection with the equations (1) and (4)

Figure 3:
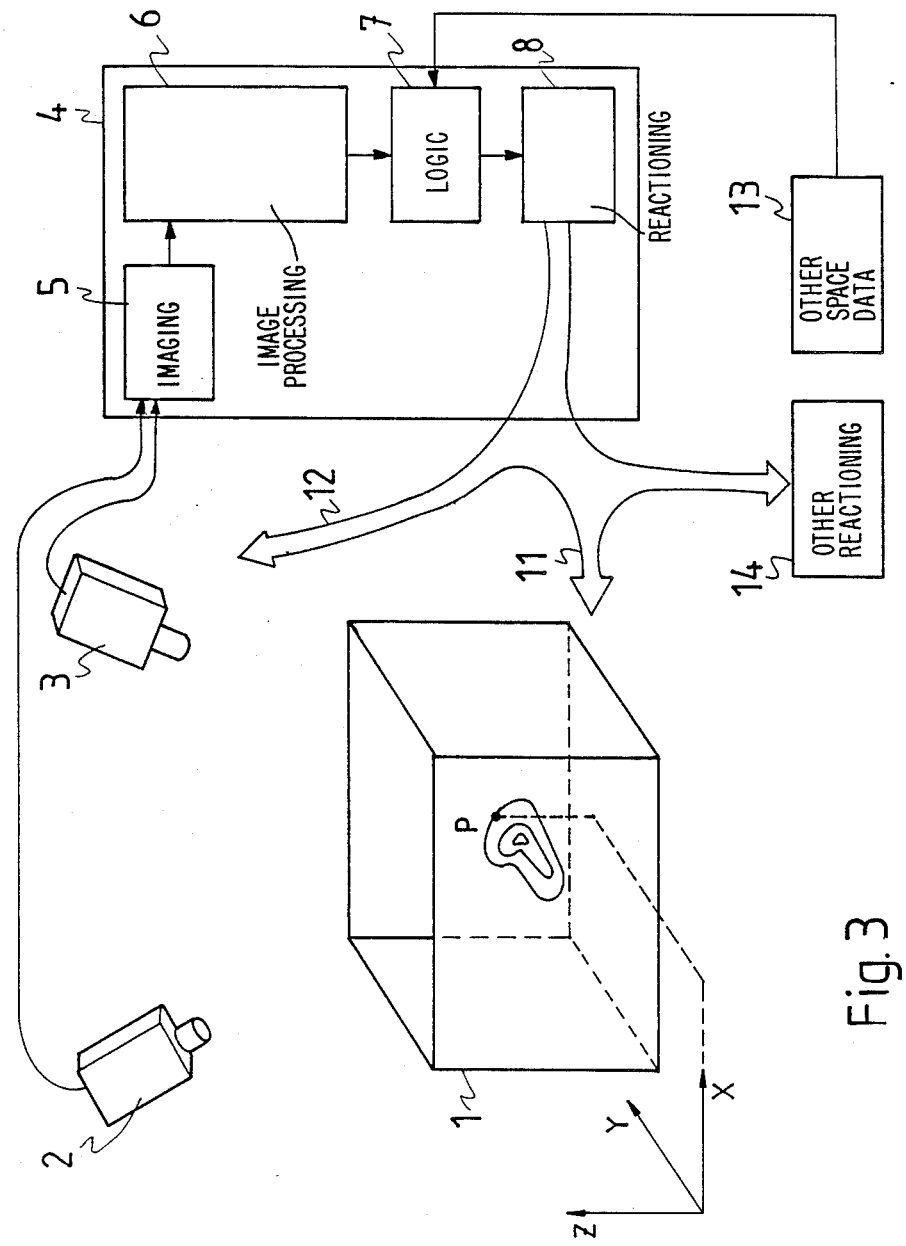
FIG. 3 illustrates a measuring system applying the method of the present invention, shown as a block diagram.

FIG. 3 illustrates a measuring system where the method of the invention is applied. The object space 1 to be observed is located in the three-dimensional axis of coordinates XYZ. The object is formed of the observable points P (X, Y, Z). The measurement is carried out by registering the object space by means of the image acquisition devices 2 and 3, such as video cameras, located at given intervals from each other. The image acquisition devices are connected to a data processing system 4. The data processing system 4 comprises for instance the registering unit 5, the image processing unit 6, the logic unit 7 and the functional unit 8. The registering unit 5 controls the image acquisition and the possible signalization of the measuring points, and transmits the images forward. It is provided for instance with the necessary timers and A/D converters. In the image processing unit 6, the images are interpreted: the common points of both images are searched and the image coordinates p'(x, y) are calculated, and possibly the characteristic data of the object point is interpreted; the object coordinates of the object point P(X, Y, X) are calculated, intermediate results are stored, and possibly some timewise comparisons are carried out in between the results. The final result is fed into the logic unit 7, where the decisions for actions are made. Into the decision-making process of the logic unit 7 there can also be fed other space data in addition to the space data 13 acquired during the survey. The functional unit 8 takes care of the necessary actions 11 directed to the object space, the necessary actions 12 directed to the image acquisition space and other actions 14, which include for example guidance of the operations in the object space.

Figure 4:
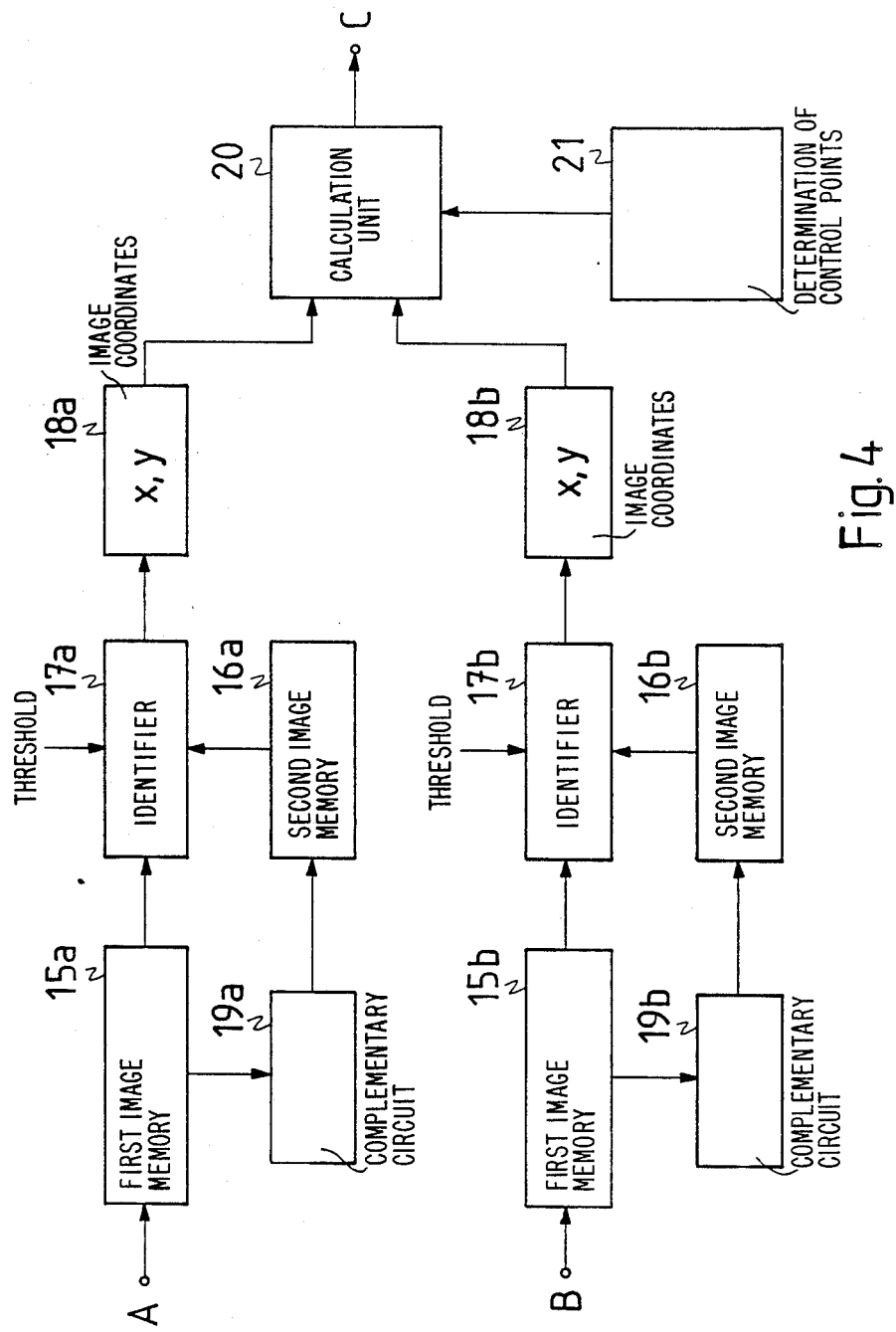
FIG. 4 illustrates the image processing unit as a block diagram.

In FIG. 4 there is illustrated a preferred embodiment of the image processing unit 6. Through the input interface A, B of the unit, a digitized video signal is fed in from both of the image acquisition devices 2, 3 into the first image memories 15a, 15b. The first and the second image memories 15a, 15b and 16a, 16b respectively are connected to the identifier 17a, 17b of changed image areas, wherein the threshold value is also set. The identifier 17a, 17b is coupled to the determination circuit 18a, 18b of the image coordinates x, y of the transformation point. When desired, the contents of the second image memory 16a, 16b can be renewed from the image acquisition device 2, 3, through the complementary circuit 19a, 19b of the second image memory.

The digitized image signal is stored into the first image memory 15a, 15b and further into the identifier 17a, 17b of changed image areas, whereinto the previously sent image information from the second image memory 16a, 16b, or corresponding information, is also stored. When a given image area is identified as changed in the identifier 17a, 17b, it is checked whether the changed image information, such as the intensity of the image area, surpasses the preset threshold value, and if the answer is positive, the coordinates x, y of the changed point are calculated by aid of the determination circuit 18a, 18b.

When the point of change x, y is determined on the image plane of each image acquisition device 2, 3, the said image coordinates are fed into the calculation unit 20 or corresponding data processing unit. The equation (4) is solved with respect to the object space coordinates, whereafter the calculated coordinates X, Y, Z of the object point are fed into the logic unit 8 through the output interface C.

Before the measurement proper, the orientation parameters must be calculated as was explained above. This is carried out by aid of the determination of the control points, which procedure in FIG. 4 is illustrated by the block 21. The orientation parameters are calculated in the calculation unit 20 for instance on the basis of the equation (1) or (2) or on the basis of the matrix (6).

The measuring of the control points is illustrated in FIG. 5. The image acquisition devices and their orientations are represented by the arrows 22, 23. In the object space coordinates XYZ, there is the object 24 to be observed, which together with its surroundings is included in the field of vision, i.e. the object space, of both of the image acquisition devices. In this case the control points 25 are marked as clearly distinguishable from the background on different sides of the object space most advantageously so that the object under observation is included in the space outlined by the control points. In FIG. 5, there are marked nine control points 25. The image coordinates $x_k$, $y_k$ of the points are measured from the images by means of the measuring system of the apparatus itself. The object space coordinates $X_k$, $Y_k$, $Z_k$; k=1, 2... 9 are measured for example geodetically by employing an electronic tachymeter, and the coordinate values are fed, for instance by aif of a keyboard, into the calculation unit 20. Thereafter, by aid of the calculation unit and on the basis of the transformation matrix (6), there are calculated the orientation parameters $a_{11}...a_{33}$. The object space coordinates of the control points can also be fed directly into the calculation unit from the tachymeter coupled to the apparatus.

When the orientation parameters are calculated by aid of the control points, the object space is defined and the control points, i.e. their marks or traces, can be removed. Thereafter they do not in any way limit the measuring of the object or movements in the object space. It is naturally clear that the above described measuring of the control points can be carried out in an empty object space, i.e. without any specific object under measurement.

When the apparatus has "learned" these control points, it is capable of determining all other points in the object space seen by both of the cameras. By indicating these unknown points, the system calculates coordinates for them. In order to indicate the points to be measured, there can be employed measuring aid marks, specific light sources or a spot of light scanning the object and/or the whole of the object space. Particular signalization methods are not needed in all cases, but instead of them there can be constructed systems which automatically search the object for interesting points of measurement. Movable objects are easily located as such.

It is particularly emphasized that the image acquisition device is in operation such that in addition to visible light, it is capable of registering other electromagnetic radiation as well. In the interpretation, the object point located three-dimensionally on the basis of radiation intensities can also be provided with the local characteristic information of the said object point. The use of the method is not limited by the image resolution, but this is always related to the required accuracy of measurement.

The structure of the measuring system applying the method of the invention can in various modifications and surroundings be remarkably different from those illustrated in FIGS. 3 and 4. The structure is also affected by the other data processing systems employed by the user, by the required degree of automation and the nature of the operations 11, 12 and 14.

I claim:

1. A method for the three-dimensional surveillance of an object space, comprising the steps of
   (a) arranging at least two image acquisition devices such as video cameras to register the said object space;
   (b) positioning said image acquisition devices at an angle with respect to each other to observe said object space;
   (c) digitizing the images received by the image acquisition devices;
   (d) locating object points on the image planes of the image acquisition devices;
   (e) calculating the space coordinates of the object points in the three-dimensional object space on the basis of the image coordinates of these object points and present constants;

(f) arranging control points in this object space;

(g) measuring the object coordinates (Xk, Yk, Zk; k=1, 2, 3...) of said control points;

(h) locating said control points on the image planes of the image acquisition devices;

(i) determining the projection wise image coordinates (Xki, Yki; Xkj, Ykj) of said control points on said images from the corresponding image acquisition devices whereafter said control points can be removed;

(j) calculating new orientation parameters ($a_{11} \ldots a_{33}$) of projective resection on the basis of the image coordinate and space coordinate values of the control points;

(k) observing object points on the image planes of the image acquisition devices;

(l) registering the projectionwise image coordinates ($X_1$, $Y_1$, $X_2$) of said observed object points from the corresponding image acquisition device;

(m) solving the unknown object coordinates (X, Y, Z) of said observed object points in a real-time process by aid of said registered image coordinates (x, y) by making use of projective intersection and by employing the following transformation matrix:

$$\begin{vmatrix} X \\ Y \\ Z \end{vmatrix}_{ij} = \begin{vmatrix} X_o \\ Y_o \\ Z_o \end{vmatrix}_{ij} + \begin{vmatrix} a_{11} & a_{12} & a_{13} \\ a_{21} & a_{22} & a_{23} \\ a_{31} & a_{32} & a_{33} \end{vmatrix}_{ij} \cdot \begin{vmatrix} x \\ y \\ o \end{vmatrix}_{ij}$$

where

| | |
|---|---|
| $X_i, Y_i, Z_i =$ $X_j, Y_j, Z_j$ | the object space coordinates, i.e. the coordinates of the object points in the XYZ coordinates of the object space; |
| $X_{oi}, Y_{oi}, Z_{oi} =$ | the constants representing the projection point $o_i$, $o_j$ of each image acquisition device i, j; |
| $a_{11} \ldots a_{33} =$ | the projective orientation parameters of the images; |
| $x_1, y_1 =$ $x_1, y_1$ | the constants of the image points on the image planes of each image acquisition device i, j; |
| i, j. = | the image acquisition devices i and j. |

2. The method of claim 1, comprising the steps of using the once determined orientation parameters ($a_{11} \ldots a_{33}$) when solving the unknown object coordinates (X, Y, Z) of the object points on the basis of the image coordinates (x, y) observed by the image acquisation devices, as long as the said devices are positioned at a solid angle with respect to each other and are registering the desired object space.

3. The method of claim 2, comprising the step of coupling image acquisition devices at given distances to each other in a stationary manner and at a solid angle with respect to each other, so that their common field of vision, i.e. the object space, is determined and this space can be continuously observed.

4. The method of claim 1, comprising the step of choosing the control points so that they cover the three-dimensional space registered by the image acquisition devices.

5. The method of claim 1, comprising the step of arranging the number of the control points more than 5, i.e. more than the smallest number required in the calculation or the orientation parameters.

6. The method of claim 1, comprising the step of signalizing the object points to be measured by aid of measuring aid marks.

7. The method of claim 6, comprising the step of signalizing the object points to be measured by aid of spots of light arranged to scan the object space.

* * * * *